(Model.)

W. BOWKER, E. M. COLE & A. L. SMITH.
EYEGLASSES.

No. 346,713. Patented Aug. 3, 1886.

Witnesses:
E. J. Rogers
Clarkson K. Chipps

Inventors.
Wm. Bowker
E. Merritt Cole
Andrew L. Smith

United States Patent Office.

WILLIAM BOWKER, E. MERRITT COLE, AND ANDREW L. SMITH, OF GENEVA, NEW YORK.

EYEGLASSES.

SPECIFICATION forming part of Letters Patent No. 346,713, dated August 3, 1886.

Application filed July 10, 1885. Serial No. 171,238. (Model.)

*To all whom it may concern:*

Be it known that we, WILLIAM BOWKER, E. MERRITT COLE, and ANDREW L. SMITH, all of Geneva, Ontario county, New York, have invented a certain new and useful Improvement in Eyeglasses; and we do hereby declare that the following is a full, clear, and exact description of the same, reference being had to the drawings accompanying and making a part of this specification.

This invention has relation to improvements in eyeglasses; and it consists in the construction and arrangement of parts, as will be hereinafter described, and particularly pointed out in the claim.

Figure 1:
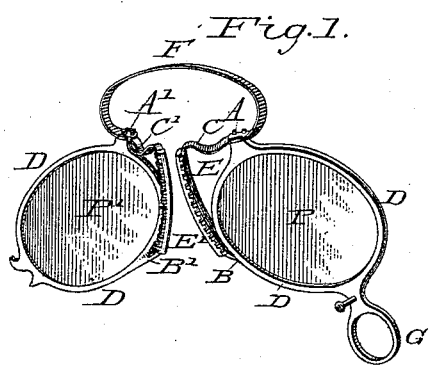
Figure 2:
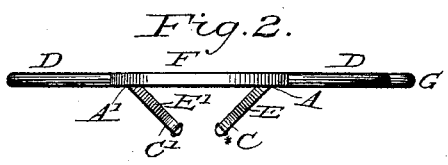
Figure 3:
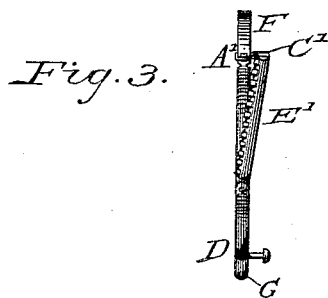

In the accompanying drawings, Figure 1 is a perspective view of our invention. Fig. 2 is a top plan view, and Fig. 3 is an edge view.

Heretofore eyeglasses have been made with the nose-pieces pivotally attached to the rims of the frame in such a position that they can be swung on their pivots at an angle to the plane of the lenses. Such construction of nose-pieces is liable to set uneven on the nose of the wearer, and also wear away at their pivotal points from constant wear and become useless. This construction of eyeglasses is shown in the patent of Micheals, No. 298,490, which Letters Patent are owned and controlled by us.

By our invention we obviate the above difficulties by permanently attaching the nose-pieces to the rims of the frame, whereby said nose-pieces are rendered rigid and true to the eyes of the wearer.

To these ends our invention is illustrated in the drawings as showing the nose-pieces E E' rigidly attached to the rims D by suitable screws, lugs, rivets, or solder at two points, one above and one below the center or major axis of the lenses, and arranged so that they shall stand in an angular position with relation to the remainder of the eyeglass-frame.

The frames D, containing the lenses P P', are provided with a handle, G, and a spring, F, made of any suitable material. At B B' suitable lugs are formed upon the frame at a point below the center of the lenses, or below a line drawn from the center of one lens to the center of the other, as the eyeglasses stand in their natural position to be worn. To the lugs B B' are rigidly attached the lower end of the nose-pieces E E', in such a manner that they proceed upward at an acute angle to the plane of the lenses to a point, C C', and are there bent so that they again approach the plane of the lenses and join the frames D at a point, A A', above the center of the lenses, and are rigidly secured thereto by any suitable means.

The nose-pieces are fastened to the frame, either at one or both ends, by lugs or other fastening means, so that they may remain rigid in an angular position.

The nose-pieces E E' may be made of one continuous piece of metal from points A A' to B B', or may be made of two or more pieces, if we so elect.

We do not claim a structure in which the nose-piece is adjustable at an angle to the plane of the glasses, and when adjusted may be held rigidly, since that is shown in the patent to Micheals above referred to; but What we do claim is—

The eyeglasses herein described, having the nose-pieces rigidly secured to the rims D of the frame of the glasses at two points, so as to be permanently held in an angular position to the plane of the lenses, as shown and described, and for the purpose set forth.

Dated at Geneva, New York, June 8, 1885.

WM. BOWKER.
   E. MERRITT COLE.
   ANDREW L. SMITH.

Witnesses:
 E. J. ROGERS,
 CLARKSON K. CHIPPS.